US011196578B2

(12) United States Patent
Kaczmarek et al.

(10) Patent No.: US 11,196,578 B2
(45) Date of Patent: Dec. 7, 2021

(54) DISTRIBUTED MULTI-TENANT, MULTI-SERVICE SERVER-SIDE ARTIFACT CACHING

(71) Applicant: Microsoft Technology Licensing, LLC, Redmond, WA (US)

(72) Inventors: Michal Kaczmarek, Issaquah, WA (US); Krishna Kannan, Seattle, WA (US); Vignesh Somasundaram, Issaquah, WA (US); Marvin Prieto Adriano, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/553,458

(22) Filed: Aug. 28, 2019

(65) Prior Publication Data

US 2021/0067363 A1 Mar. 4, 2021

(51) Int. Cl.
*H04L 12/18* (2006.01)
*G06F 16/22* (2019.01)
*H04L 12/58* (2006.01)

(52) U.S. Cl.
CPC .......... *H04L 12/1831* (2013.01); *G06F 16/22* (2019.01); *H04L 12/1881* (2013.01); *H04L 12/1895* (2013.01); *H04L 51/046* (2013.01)

(58) Field of Classification Search
CPC ............... H04L 12/1831; H04L 51/046; H04L 12/1895; H04L 12/1881; G06F 16/22
See application file for complete search history.

(56) References Cited

U.S. PATENT DOCUMENTS 9,003,141 B2 * 4/2015 Nielsen ............... G06F 11/1438
711/162
9,319,360 B2 4/2016 Shih et al.
(Continued)

OTHER PUBLICATIONS

"Live Chat Widget", Retrieved from https://web.archive.org/web/20190323163118/https:/getsitecontrol.com/chat-widget/, Mar. 23, 2019, 6 Pages.

(Continued)

*Primary Examiner* — Philip C Lee
(74) *Attorney, Agent, or Firm* — Chin IP, PLLC

(57) ABSTRACT

The disclosed technology is generally directed to online chat management services. In one example of the technology, organization information is accessed for tenants. The organization information includes, for each organization, configuration information for the organization. Each organization belongs to a corresponding tenant. Worker service instances are scheduled to perform fills associated with the organizations, such that sufficient fills are performed for each organization according to the configuration information for the organizations in the accessed organization information. Each fill includes: causing artifacts associated with a function to be created, such that the artifacts associated with the function are configured based on the corresponding tenant. Artifact information associated with the created artifacts is received, including at least one unique identifier associated with the created artifacts for the function. Server-side caching of a cache record that includes the artifact information associated with the created artifacts for the function is performed.

19 Claims, 5 Drawing Sheets

(56) References Cited

U.S. PATENT DOCUMENTS

| | | | |
|---|---|---|---|
| 2005/0114604 A1* | 5/2005 | Artobello | G06F 21/604 |
| | | | 711/130 |
| 2011/0087730 A1 | 4/2011 | Li et al. | |
| 2012/0296954 A1 | 11/2012 | Lyle et al. | |
| 2015/0033149 A1* | 1/2015 | Kuchoor | G06F 3/0481 |
| | | | 715/753 |
| 2016/0080519 A1* | 3/2016 | Hansen | H04L 67/2852 |
| | | | 709/219 |
| 2017/0109013 A1 | 4/2017 | Hong | |
| 2018/0054495 A1 | 2/2018 | Mak et al. | |
| 2018/0260782 A1 | 9/2018 | Bay et al. | |
| 2019/0163664 A1* | 5/2019 | Karani | G06Q 10/00 |
| 2019/0268435 A1* | 8/2019 | Konoor | H04L 67/10 |
| 2020/0053089 A1* | 2/2020 | Singh | G06F 21/604 |

OTHER PUBLICATIONS

"Live Chat Widget for Websites & Apps", Retrieved from https://web.archive.org/web/*/https://www.revechat.com/live-chat-widget/, Mar. 28, 2019, 8 Pages.

Kraus, Krzysztof, "Customize Your Chat Widget", Retrieved from https://www.livechatinc.com/help/customize-your-chat/, Jul. 15, 2019, 17 Pages.

* cited by examiner

DISTRIBUTED MULTI-TENANT, MULTI-SERVICE SERVER-SIDE ARTIFACT CACHING

BACKGROUND

Online live chat is a type of networking communication that may involve real-time communications, including text communications, between two or more parties. Chat messages are typically short in order to enable other participants to respond quickly. This may create a feeling similar to a spoken conversation, distinguishing chatting from other text-based online communication forms such as Internet forums and email.

Online live chat may be increasingly used by businesses to communicate with customers. If a business has live chat enabled, typically, a customer can communicate with a business to receive support, such as technical support or other support, ask questions, schedule appointments, or the like, via the live chat. A business may enable communications with customer over live chat for the customer to have a chat session with a live agent, with a bot, or either depending on the circumstances.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to online chat management services. In one example of the technology, organization information is accessed for a plurality of tenants. In some examples, the organization information includes, for each organization of a plurality of organizations, configuration information for the organization. In some examples, each organization belongs to a corresponding tenant of the plurality of tenants. In some examples, the plurality of organizations includes organizations corresponding to at least two tenants of the plurality of tenants. In some examples, a plurality of worker service instances is scheduled to perform a plurality of fills associated with the plurality of organizations, such that sufficient fills are performed for each organization according to the configuration information for the organizations in the accessed organization information. In some examples, each fill of the plurality of fills includes: causing artifacts associated with a function to be created, such that the artifacts associated with the function are configured based on the corresponding tenant. In some examples, artifact information associated with the created artifacts is received, including at least one unique identifier associated with the created artifacts for the function. In some examples, server-side caching of a cache record that includes the artifact information associated with the created artifacts for the function is performed.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
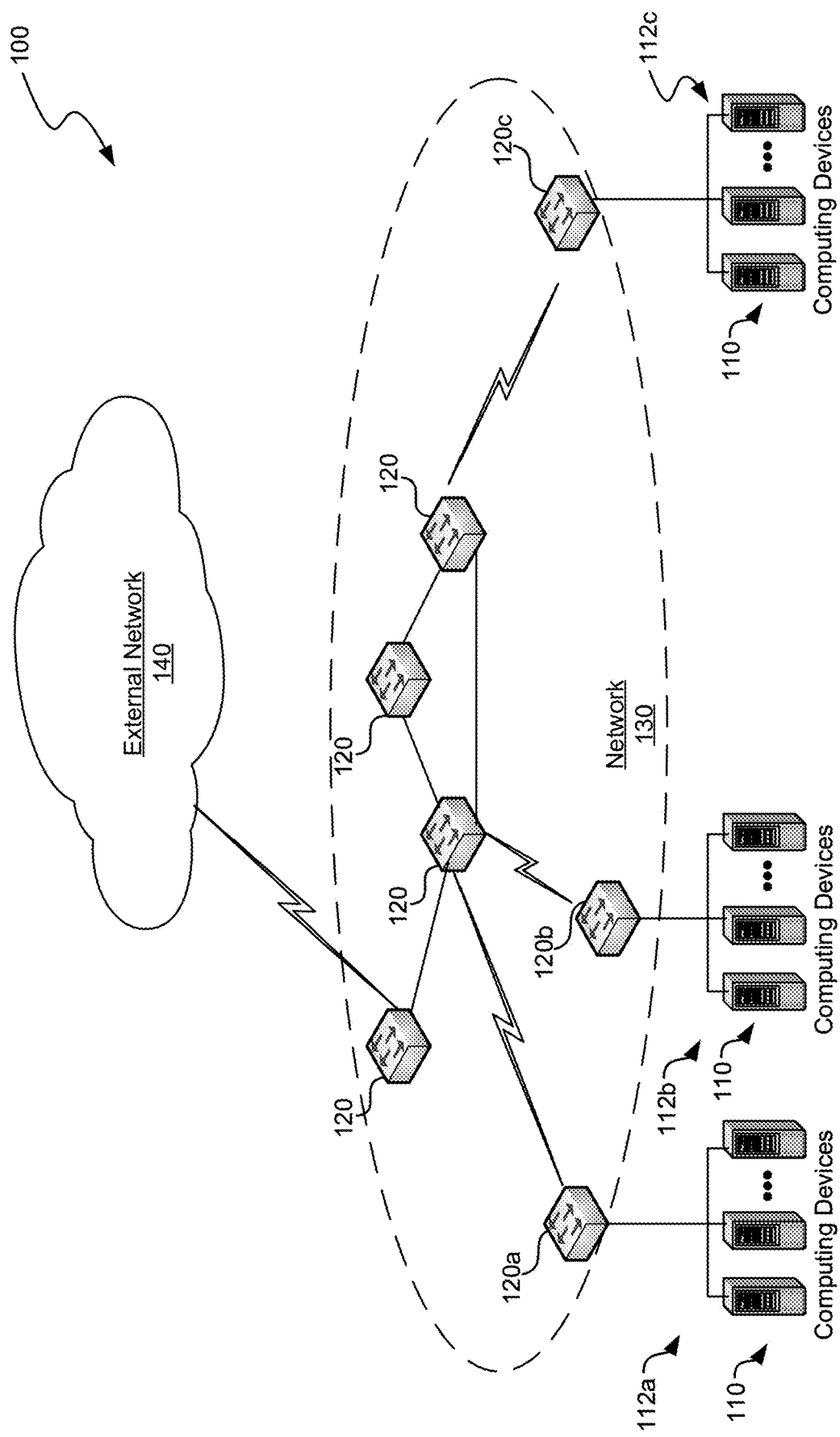
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to online chat management services. In one example of the technology, organization information is accessed for a plurality of tenants. In some examples, the organization information includes, for each organization of a plurality of organizations, configuration information for the organization. In some examples, each organization belongs to a corresponding tenant of the plurality of tenants. In some examples, the plurality of organizations includes organizations corresponding to at least two tenants of the plurality of tenants. In some examples, a plurality of worker service instances is scheduled to perform a plurality of fills associated with the plurality of organizations, such that sufficient fills are performed for each organization according to the configuration information for the organizations in the accessed organization information. In some examples, each fill of the plurality of fills includes: causing artifacts associated with a function to be created, such that the artifacts associated with the function are configured based on the corresponding tenant. In some examples, artifact information associated with the created artifacts is received, including at least one unique identifier associated with the created artifacts for the function. In some examples, server-side caching of a cache record that includes the artifact information associated with the created artifacts for the function is performed.

In some examples, a server-side omni-channel service manages pre-creation and caching of chat artifacts in a multi-tenant, multi-service-instance environment in which the instantiation of each new chat requires a series of external network service calls that may be time-consuming. Due to the pre-creation and caching of the chat artifacts, it may be possible to begin chat sessions quickly, such as in less than a second, upon request, even though the creation of a new chat requires a series of external network service calls that frequently take five seconds or longer to complete.

Each tenant may have one or more associated organizations. In some examples, there are a pre-configured number (i.e., quantity) of chats to load on a per-organization basis, so that some organizations are not crowded out by other organizations. In some examples, a conference cache coordinator tracks the organizations and their configurations, and manages and schedules worker service instances for the pre-loading of chats, so that the pre-loading happens in a continual and concurrent matters based on the requirements of the configurations.

The configurations for each organization may be based on the predicted demand for concurrent chats for the organization. In some examples, the worker service instances make the network service calls to a chat service for the chat service to create chat artifacts for the tenant associated with the organization, including an anonymous visitor token that may be used by any participants for the tenant. In some examples, the actual participants remain unassigned until a live chat is created based on the artifacts created prior to the actual live chat.

The chat service may send information back to the worker service instance after the artifacts for the pre-loaded chat are requested to be made, where the information may include a unique identifier for the artifacts. In some examples, the worker service instance then stores information for each pre-loaded chat as a cache record, where each organization has a separate database for that organization that includes the stored cache records for the organization.

Responsive to a live chat being requested for an organization, the omni-channel service may access a cache record for the organization, link the participants to the chat, and, via communication with the chat service, cause a live chat session to begin. Because the time-intensive external network service calls needed for the pre-created artifacts were already performed, the live chat session may begin relatively quickly.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Various computing devices and nodes in environment 100 may include one or more computing device and network nodes included in one or more networks that performs one of more of the processes disclosed herein, such as the process of FIG. 5 discussed below.

Illustrative Computing Device

Figure 2:
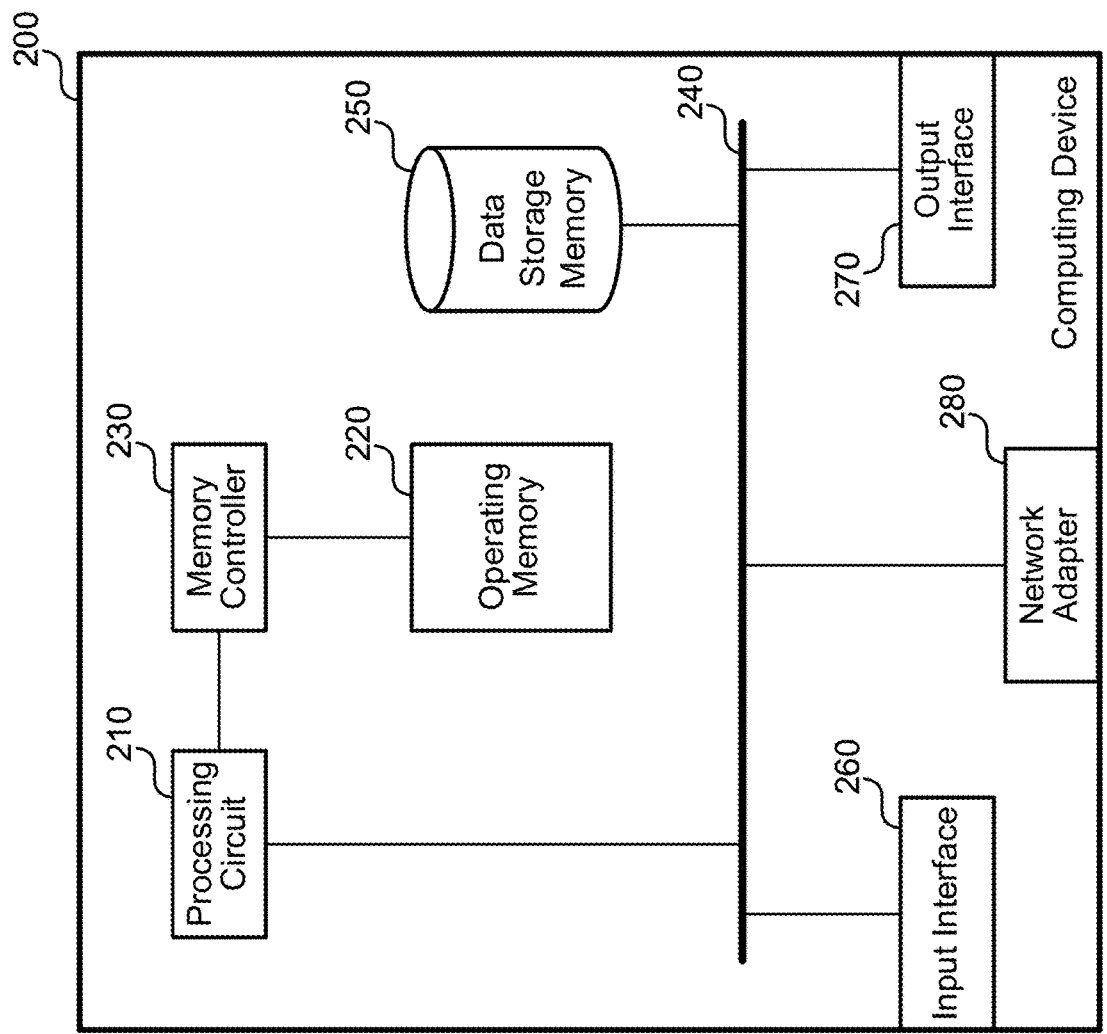
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, embedded device, programmable logic controller (PLC), or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices, nodes, members, or other entities illustrated in or referred to in various figures, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims, whether used in the singular form or the plural form, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions, such as various disclosed actions discussed in greater detail below.

Illustrative System

Figure 3:
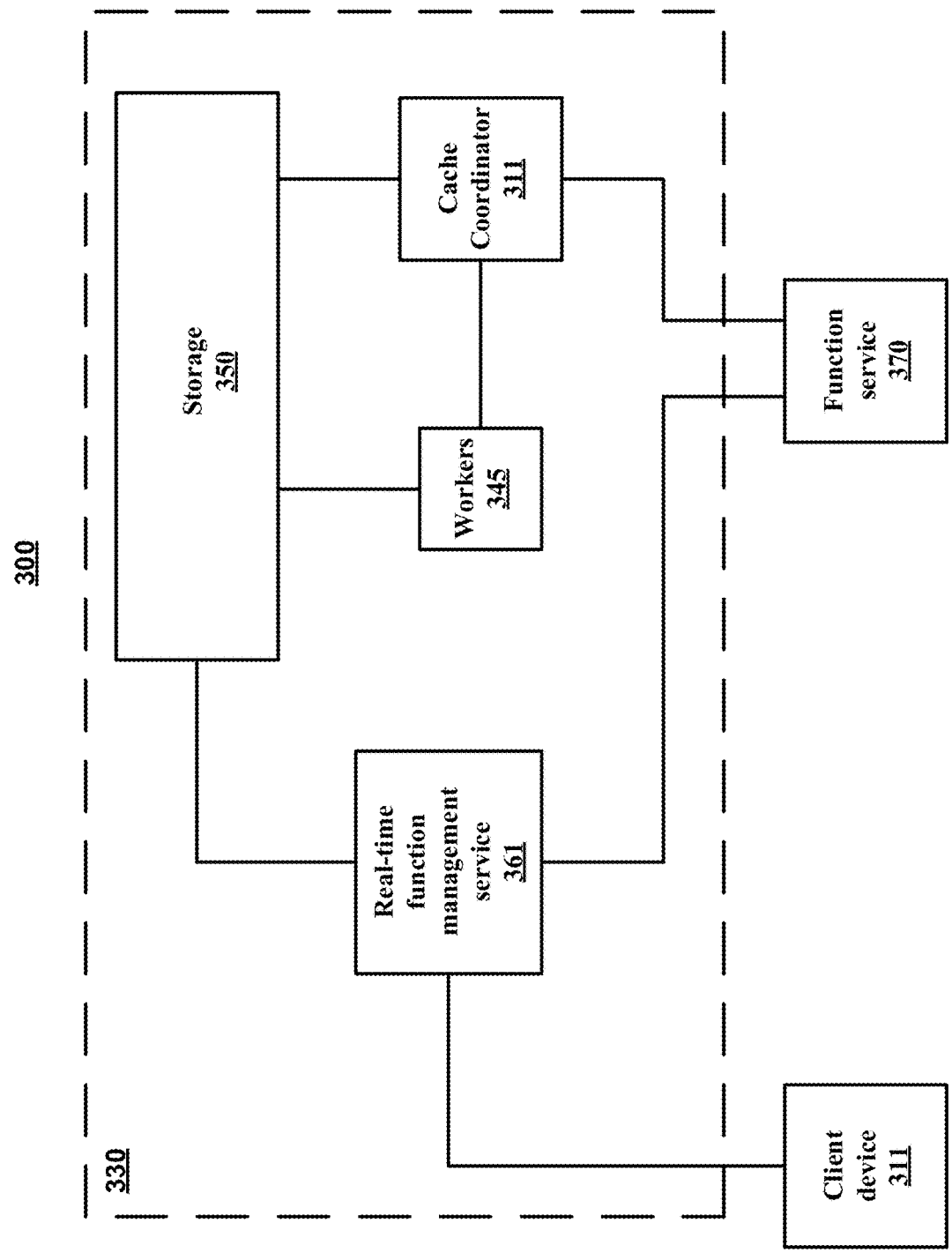
FIG. 3 is a block diagram illustrating an example of a system.

FIG. 3 is a block diagram illustrating an example of a system (300). System 300 may include client 311, function service 370, and server-side omni-channel service 330. Server-side omni-channel service 330 may include cache coordinator 340, worker server instances 354, real-time function management services 361, and storage 350.

In some examples, function service 370 provides a function that may be relatively slow at least some of the time. In some examples, the time required by the function may vary significantly. In some examples, the function may be an external function that requires a series of external network service calls. In some examples, the external function may be an input-dependent internal function, such as a computation taking exponential time, in which the time required to complete the function is dependent the input or inputs received by the function. In some examples, the function is a chat function, and function service 370 is a chat service.

In some examples, server-side omni-channel service 330 is a distributed system that is configured to manage pre-creation and caching of artifacts associated with the function performed by function service 360 in a multi-tenant, multi-service-instance environment supporting concurrent functions. Due to the pre-creation and caching of the function artifacts, it may be possible to perform the function relatively quickly, responsive to being requested by client 311.

Each tenant may have one or more associated organizations for which function services are managed by omni-channel service 330. In this way, in some examples, omni-channel service 330 includes server-side management of functions services for multiple tenants, for which each tenant includes one or more organizations. In some examples, storage 350 may include multiple types of storage, which may be independently accessible in different ways in some examples. In some examples, storage 350 includes one or more databases that include organization information. The organization information may include, for each of the organizations, configuration information for the organization.

In some examples, cache coordinator 340 is configured to access the organization information in storage 350, and to schedule worker service instances 345 to perform fills associated with the organizations. In some examples, worker service instances 345 are scheduled to perform fills by cache coordinator 340 so that sufficient fills are performed for each organization according to the configuration information for the organizations in the accessed organization information.

In some examples, the configurations are based on expected demand for concurrent requests for instances of the function by clients, such as client 311, of the organization.

The fills performed by worker service instances 345 may include causing artifacts associated with the function to be created, such that the artifacts associated with the function are configured based on the corresponding tenant. Worker server instances 345 may cause the artifacts to be created by communication with function service 370, which may performs create the artifacts in response to the communication from worker service instances 345, where the communication may include an indication of the tenant for which the function artifacts are being pre-created.

In some examples, after function service 370 creates artifacts based on a request from one of the worker service instances 345, function service 370 returns to the requesting worker service instance 345 artifact information associated with the created artifacts including at least one unique identifier associated with the created artifacts for the function. The requesting worker service instance 345 may receive the artifact information, and perform server-side caching of a cache record that includes the artifact information associated with the created artifacts for the function.

In some examples, responsive to a client such as client 311 requesting an instance of the function to be performed, the request is received by real-time function management service 361. Responsive to receiving the request, real-time function management service 361 may obtain a cache record for the corresponding function from storage 350, and communicate with function service 370 to initiate an instance of the function based on the cache records and the corresponding artifacts that were pre-created by function service 370. Because the artifacts were pre-created, it may be possible for the function instance to be performed relatively quickly from the time that the request was made by client 311.

The function performed by function service 370 may be different suitable functions in various examples. In some examples, the function may be chat function, as discussed in FIG. 4 according to one example.

Figure 4:
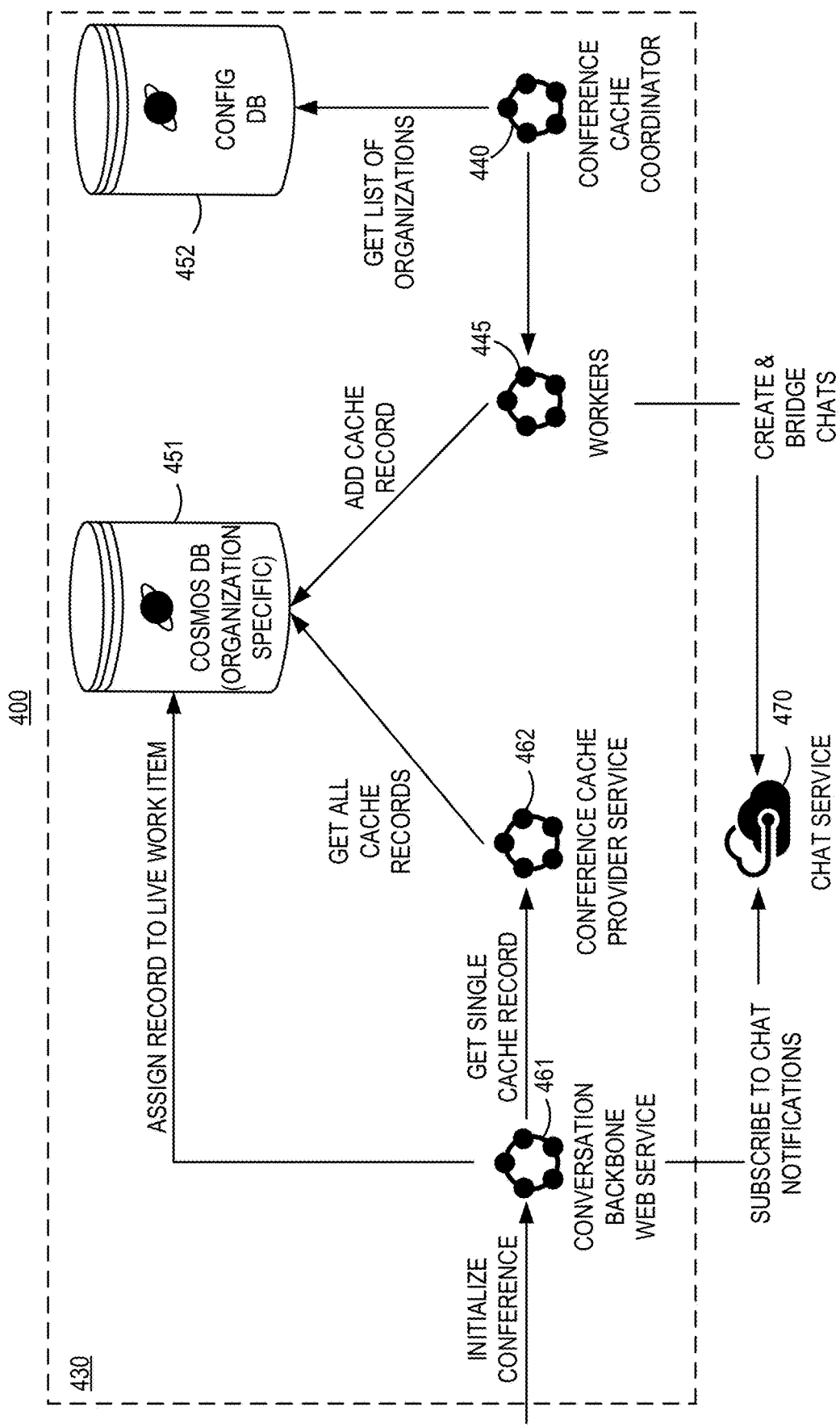
FIG. 4 is a block diagram illustrating an example of the system of FIG. 3.

FIG. 4 is a block diagram illustrating an example of a system (400), which may be an example of system 300 of FIG. 3 in which the function is a chat function. System 400 may include chat service 470 and server-side omni-channel service 430. Server-side omni-channel service 430 may include conference cache coordinator 440, workers 445, cosmos database (DB) 451, Config DB 452, Conversation-BackboneWeb service 461, and Conference Cache Provider service 462. Chat service 470 may be an example of function service 370 of FIG. 3. Conference cache coordinator 440 may be an example of cache coordinator 340 of FIG. 3. Workers 445 may be an example of worker service instances 345 of FIG. 3. Cosmos DB 451 and Config DB 452 may part of an example of storage 350 of FIG. 3. ConferenceBackboneWeb service 461 may be an example of real-time function management service 361 of FIG. 3.

In some examples, server-side omni-channel service 430 manages pre-creation and server-side caching of chat artifacts in a multi-tenant, multi-service-instance environment that manages many concurrent chat requests. In some examples, Config DB 452 stores a list of all of the organizations of all of the tenants that have joined server-side omni-channel service 430 in a particular geographical region. In some examples, multiple Config databases may exist in each of multiple separate geographical areas, each storing data associated with tenants in its geographical area. In some examples, when a new tenant signs up with server-side omni-channel service 430, the tenant creates one or more organizations. For instance, in one example, the organizations may be sales, billing, and internal. A tenant record may be created for the tenant with information on the organizations for the tenant, and other information, with the tenant record stored in the Config DB 452 in the geographical region of the tenant.

The organizations may be added the list of organizations stored in Config DB 452 for the geographical region to which the tenant belongs when the tenant joins server-side omni-channel service 430. In some examples, the list of organizations also includes configurations for each organization. The configurations may include a number as to how many pre-loaded chats should be concurrently filled for that organization, and/or the rate at which pre-loaded chats should be filled for the organization to maintain the number of chats that are expected to need to be concurrently filled. The configuration may be based on the predicted demand for concurrent chats for the organization.

Conference cache coordinator 440 may periodically check Config DB 452 for updates to the organization information, such as newly added organizations, removed organizations, changes in configurations for existing organizations, or the like. In some examples, conference cache coordinator 440 schedules and manages workers 445 based on the organizations and their configurations, to continually and currently perform periodic fills. In some examples, workers 445 perform fills based on instructions received from conference cache coordinator 440.

A fill performed by a worker 445 is accomplished as follows in some examples. Each fill involves the pre-loading/pre-creation of one chat for an organization. In some examples, the pre-creation of one complete chat for an organization is accomplished via worker 445 using an API exposed by chat service 470 to make a series of external network service calls to chat service 470. In some examples, one complete chat includes two linked chats, as discussed in greater detail below. Via this communication, the worker 445 requests the creation of artifacts for a chat for a particular tenant.

In response to the request, chat service 470 may create the requested chat artifacts. In some examples, the chat artifacts include a visitor token, which includes security artifacts. In some examples, the visitor token is generic to the participants—each participant can be any participant for the tenant. Accordingly, in these examples, the visitor token can be for any participants for the tenant for which the visitor token is created. In some examples, the created artifacts are categorized and configured differently for each tenant of the multiple tenants. In some examples, the participants are not assigned when the artifacts are created. In some examples, the artifacts are the components necessary for a chat to be created, excluding the actual participants.

After chat service 470 creates the artifacts for the requested chat, in some examples, chat service 470 returns to the requesting worker 445 artifact information associated with the requested chat artifacts. The artifact information may include an identifier for the artifacts for the chat. The identifier is a globally unique identifier in some examples. After receiving the artifact information, the requesting worker 445 may create a cache record for the pre-created/pre-loaded chat, where the cache record may include the identifier for the chat artifacts, and may also include other information from the artifact information. The requesting worker 445 may then cache the created cache record by storing the created cache record in Cosmos DB 451.

In some examples, Cosmos DB 451 includes a separate database for each organization. The database for each organization in Cosmos DB 451 may store each of the cache records for the organization. Further, in some examples, the database for each organization includes a stored fill state record for the organization, which is used to track the state of the fill job, and which indicates whether the cache is full or not. Conference cache coordinator 440 may receive information from the fill state record of each organization via workers 445, and use this information to coordinate the fill state record in the database and use the information to coordinate the scheduling and tracking of workers 445 to perform the fills.

As discussed above, in some examples, conference cache coordinator 440 manages the fills on an organization-by-organization basis, based on the configurations for each organization. This may avoid a noisy neighbor problem in which some smaller organizations might otherwise be "starved" due to larger organizations receiving all of the fills. Server-side omni-channel service 430 is configured to use the concept of organizations, which, among other things, conference cache coordinator 440 uses to manages the fills based on the configurations. In some examples, while server-side omni-channel service 430 uses the concepts of organizations, chat service 470 does not use the concept of organizations, but does use the concept of tenant.

When chat service 470 pre-creates artifacts for a chat, the artifacts may be used by any users for a particular tenant. Accordingly, in some examples, the pre-created chats created by chat service 470 are on a per-tenant basis. However, server-side omni-channel service 430 manages the pre-created chats in such a way that they are used on a per-organization basis in some examples. The management performed by conference cache coordinator 440 may ensure that chat service 470 is not overloaded and that the capacity is distributed between organizations in a way that is based on the expected demand and does not cause starvation of smaller organizations due to a noisy neighbor problem, and to provide load balancing for the fill requests.

Conference cache coordinator 440 may perform various other functions in support of the management of fill requests. For example, conference cache coordinator 440 may include mechanisms to detect chat service 470 becoming unresponsive, and, upon detecting chat service 470 becoming unresponsive, conference cache coordinator 440 may cause workers 445 to stop communication with chat service 470 for a time so that chat service 470 has an opportunity to recover without potentially worsening the problem.

In some examples, server-side omni-channel service 430 supports multiple channels on the customer side. For example, for some organizations, when a customer initiates a chat, the customer can open a chat window, and also send an SMS message. Accordingly, in these examples, for such an organization, both a chat channel and an SMS channel are precached for each cache record. In an example with both a chat channel and an SMS channel enable, for each cache record, both chat artifacts and SMS artifacts may be created. According, a different configuration of the chats for the multiple types of artifacts may be created. In some examples, yet other suitable types of artifacts besides chat artifacts and SMS artifacts may be precached and pre-created, based on what is enabled for the organization in accordance with the configurations for the organization as stored in Config database 452 for the organization.

ConferenceBackboneWeb service 461 may be configured to perform real-time chat management services. For example, a customer using a client device may use a web browser on the client device to navigate to a web site belonging to one of the tenants that is a subscriber to the server-side omni-channel service 430, and click on a button labeled "chat" to initiate a chat with an agent of the tenant. ConferenceBackboneWeb service 461 may accordingly receive a request for a chat widget for the customer.

Accordingly, ConferenceBackboneWeb service 461 may obtain a cache record for the corresponding organization from storage 350, and, using the information in the cache record, communicate with chat service 470 to initiate a chat between the customer and the agent. In some examples, a chat between two participants may actually consist of two linked chats, each separate chat of the two linked chats being a chat between one participant and service 430. In some examples, ConferenceBackboneWeb service 461 may manage the linking between the two chats. ConferenceBackboneWeb service 461 may also add other properties to the chat where suitable.

In some examples, the chat artifacts do not expire. In other examples, the chat artifacts may expire. For instance, in some examples, the visitor token created by chat service 470 expires after a particular period of time, such as 24 hours in one example. In some examples, the artifact information provided by chat service 470 to a worker 445 that requests the chat artifacts includes information associated with the expiration time of the token, and each cache record accordingly includes information associated with the expiration time of the token corresponding to that cache record.

In some examples in which visitor tokens expire, conference cache coordinator 440, in addition to scheduling and managing fills, also manages token refresh. Conference cache coordinator 440 may use workers 445 to determine information from Cosmos DB 451 corresponding to when tokens expire, and when a token is near expiration, manage workers 445 to request refresh of the token through the API exposed by chat service 470. Conference cache coordinator 440 may manage worker 445 to cause a cache record to be locked while a token is being refreshed, so that the cache record cannot be accessed during the refresh process, thereby preventing a bad state from occurring, and managing workers 445 to cause the cache record to be unlocked responsive to the refresh is complete. ConferenceBackboneWeb service 461 may manage the live chat process such that, if a cache record to be retrieved is locked, ConferenceBackboneWeb service 461 skips the locked cache record.

In some examples in which an organization has multiple types of channels enabled according to the organization's configurations, there may be types of artifacts other than chat artifacts, such as SMS artifacts, as discussed above. Some of these other types of artifacts may expire and require refresh, and others may not expire and not require refresh. In addition to managing refresh of chat artifacts, conference cache coordinator 440 may manage refresh of other types of artifacts that require refresh.

In some examples, one layer of caching is performed as discussed above. In some examples, a second layer of caching is also performed. In some examples, the second layer of caching is performed by Conference Cache Provider service 462. In some examples, Conference Cache Provider service 462 stores and manages in-memory queues the organizations, where there is a separate in-memory queue for each organization. In some examples, Conference Cache Provider service 462 obtains all of the cache records from cosmos DB, and stores the cache records as an in-memory queue for each organization.

In some examples, when ConferenceBackboneWeb service 461 needs to retrieve a cache record for an organization based on a requested live chat, ConferenceBackboneWeb service 461 makes a request for a cache record for the organization from Conference Cache Provider service 462. In some examples, Conference Cache Provider service 462, in response to the request, returns the top cache record of the in-memory queue for the organization, where the top cache record is the oldest record in the in-memory queue for that organization. By retrieving the oldest cache record for the organization, in these examples, number of chats that require a token refresh is reduced, by ideally using the token before the token needs to be refreshed.

In some examples, responsive to a live chat being requested, as managed by ConferenceBackboneWeb service 461, ConferenceBackboneWeb service 461 also indicates that the record is a live work item in some manner, such as being causing the cache record in the organization database of the Cosmos DB to be assigned as a live work item.

As discussed above, in some examples, server-side omni-channel service 430 is a multi-service-instance service, for example, using multiple worker service instances 445, and, in some examples, using multiple service instances of other services, such as ConferenceBackboneWeb service 461, for example. The multiple service instances may assist in providing scalability. In some examples, based on the architecture described above, server-side omni-channel service 430 supports handling a very high number of concurrent chat widget requests, including concurrent chat widget requests from different tenants, using a set of specialized micro services that can be scaled up or down.

Illustrative Process

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5:
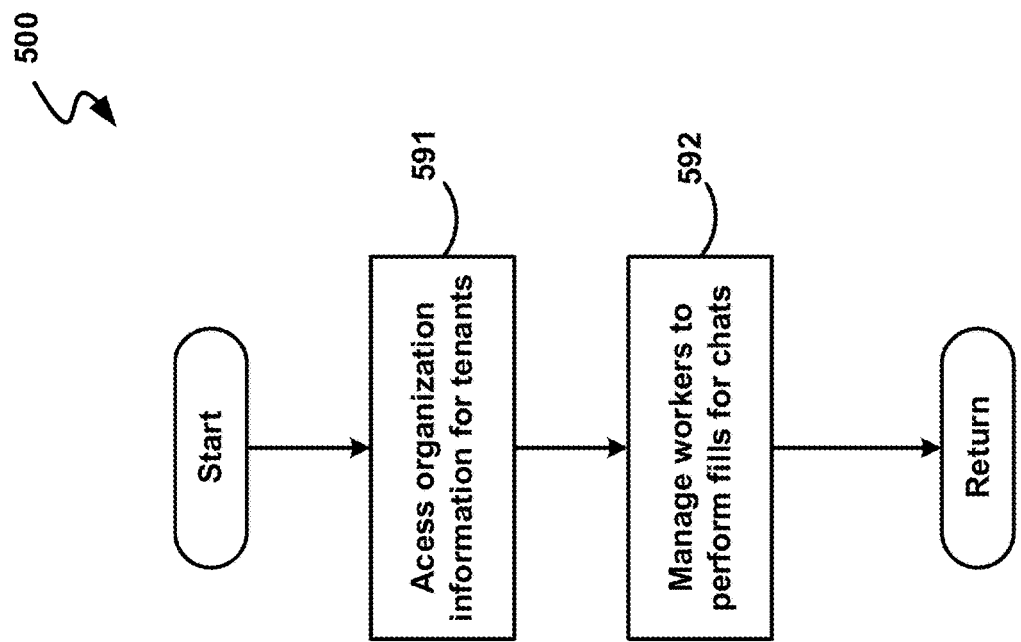
FIG. 5 is a diagram illustrating an example process, in accordance with aspects of the present disclosure.

FIG. 5 is a diagram illustrating an example dataflow for a process (590) for a blockchain system. At step 591, in some examples, organization information is accessed for a plurality of tenants. In some examples, each organization belongs to a corresponding tenant of the plurality of tenants. In some examples, the plurality of organizations includes organizations corresponding to at least two tenants of the plurality of tenants.

As shown, step 592 occurs next in some examples. At step 592, in some examples, a plurality of worker service instances is scheduled to perform a plurality of fills associated with the plurality of organizations, such that sufficient fills are performed for each organization according to the configuration information for the organizations in the accessed organization information. In some examples, each fill of the plurality of fills includes: causing artifacts associated with a function to be created, such that the artifacts associated with the function are configured based on the corresponding tenant. In some examples, artifact information associated with the created artifacts is received, including at least one unique identifier associated with the created artifacts for the function. In some examples, server-side caching of a cache record that includes the artifact information associated with the created artifacts for the function is performed.

The processing may then proceed to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
   a device including at least one memory adapted to store run-time data for the device, and at least one processor that is adapted to execute processor-executable code that, in response to execution, enables the device to perform actions in conjunction with other devices as part of a distributed system, the actions including:
   periodically determining organization information for a plurality of tenants, wherein the organization information includes, for each organization of a plurality of organizations, configuration information for the organization, wherein each organization belongs to a corresponding tenant of the plurality of tenants, and wherein the plurality of organizations includes organizations corresponding to at least two tenants of the plurality of tenants;
   managing a plurality of workers to perform a plurality of fills associated with the plurality of organizations, such that sufficient fills are performed for each organization according to the configuration information for the organizations in the organization information, such that each fill of the plurality of fills includes:
   communicating with a chat service to cause artifacts to be created, such that the artifacts are configured based on the corresponding tenant, and such that the artifacts are external chat artifacts;
   receiving, from the chat service, artifact information associated with the created artifacts including at least one unique identifier associated with the created artifacts; and
   performing server-side caching of a cache record that includes the artifact information associated with the created artifacts.

2. The apparatus of claim 1, wherein communicating with the chat service to cause the artifacts to be created includes making a plurality of external service calls.

3. The apparatus of claim 1, wherein the configuration information for each organization includes a configured quantity of concurrent pre-created chats for the organization.

4. The apparatus of claim 1, wherein the artifact information further includes an expiration time associated with the created artifacts.

5. The apparatus of claim 4, the actions further including managing the plurality of worker service instances to cause the created artifacts to be periodically refreshed based on the expiration times of the created artifacts.

6. The apparatus of claim 4, the actions further including, responsive to the created artifacts associated with a cache record being refreshed, locking the cache record until refresh of the created artifacts is complete, such that cache record cannot be used to initiate a live instance of the function while the cache record is locked.

7. A method, comprising:
   periodically determining organization information for a plurality of tenants, wherein the organization information includes, for each organization of a plurality of organizations, configuration information for the organization, wherein each organization belongs to a corresponding tenant of the plurality of tenants, and wherein the plurality of organizations includes organizations corresponding to at least two tenants of the plurality of tenants;
   managing a plurality of workers to perform a plurality of fills associated with a plurality of organizations, such that sufficient fills are performed for each organization according to the configuration information for the organizations in the organization information, such that each fill of the plurality of fills includes:
   communicating with a chat service to cause external chat artifacts to be created, such that the external chat artifacts are configured based on the corresponding tenant;
   receiving, from the chat service, artifact information associated with the created external chat artifacts including at least one unique identifier associated with the created external chat artifacts; and
   performing server-side caching of a cache record that includes the artifact information associated with the created external chat artifacts.

8. The method of claim 7, wherein causing the chat artifacts to be created includes making plurality of external service calls.

9. The method of claim 7, wherein the configuration information for each organization includes a configured quantity of concurrent pre-created chats for the organization.

10. The method of claim 7, further comprising:
    for each organization of the plurality of organizations, maintaining an in-memory queue of the cache record for the organization such that the oldest cache record for the organization is output first from the in-memory queue.

11. The method of claim 7, further comprising:
    receiving a chat widget request that is associated with a first organization of the plurality of organizations;
    responsive to the chat widget request, obtaining a cache record of the first organization;
    communicating with the chat service to initiate a chat based on the cache record obtained for the first organization and the chat artifacts corresponding to the cache record obtained for the first organization.

12. The method of claim 11, further comprising:
concurrently handing a plurality of additional chat widget requests associated with two or more of the plurality of tenants.

13. The method of claim 7, wherein the artifact information further includes an expiration time associated with the created chat artifacts.

14. The method of claim 13, further comprising:
managing the plurality of workers to cause the created chat artifacts to be periodically refreshed based on the expiration times of the created chat artifacts.

15. The method of claim 13, further comprising:
responsive to the created chat artifacts associated with a cache record being refreshed, locking the cache record until refresh of the created chat artifacts is complete, such that cache record cannot be used to initiate a live chat while the cache record is locked.

16. A processor-readable storage medium, having stored thereon processor-executable code that, upon execution by at least one processor, enables actions, comprising:
receiving organization information for a plurality of tenants, wherein the organization information includes, for each organization of a plurality of organizations, configuration information for the organization, wherein each organization belongs to a corresponding tenant of the plurality of tenants, and wherein the plurality of organizations includes organizations corresponding to at least two tenants of the plurality of tenants;
scheduling and managing a plurality of workers to perform a plurality of fills associated with a plurality of organizations, such that sufficient fills are performed for each organization according to the configuration information for the organizations in the organization information, and such that each fill of the plurality of fills includes server-side operations, including:
making a plurality of external service calls with a chat service to cause external chat artifacts to be created, such that the external chat artifacts are configured based on the corresponding tenant;
responsive to the plurality of external service calls, receiving, from the chat service, artifact information associated with the created external chat artifacts including at least one unique identifier associated with the created external chat artifacts;
creating a cache record that includes the artifact information associated with the created external chat artifacts; and
causing the cache record to be stored.

17. The processor-readable storage medium of claim 16, wherein the configuration information for each organization includes a configured quantity of concurrent pre-created chats for the organization.

18. The processor-readable storage medium of claim 16, wherein the artifact information further includes an expiration time associated with the created artifacts.

19. The processor-readable storage medium of claim 18, the actions further including managing the plurality of workers to cause the created chat artifacts to be periodically refreshed based on the expiration times of the created chat artifacts.

* * * * *